United States Patent
Ohnuma

(10) Patent No.: US 6,322,168 B1
(45) Date of Patent: *Nov. 27, 2001

(54) BRAKING FORCE CONTROL APPARATUS

(75) Inventor: Yutaka Ohnuma, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/171,507
(22) PCT Filed: Apr. 24, 1997
(86) PCT No.: PCT/JP97/01438
§ 371 Date: Jan. 19, 1999
§ 102(e) Date: Jan. 19, 1999
(87) PCT Pub. No.: WO97/41014
PCT Pub. Date: Nov. 6, 1997

(30) Foreign Application Priority Data

Apr. 26, 1996 (JP) .................................... 8-108177

(51) Int. Cl.$^7$ ...................................................... B60T 8/60
(52) U.S. Cl. .............................................. 303/155; 303/3
(58) Field of Search ................................... 303/157, 158, 303/113.4, 155, 3, 154

(56) References Cited

U.S. PATENT DOCUMENTS

| 5,158,343 | 10/1992 | Reichelt et al. . |
| 5,261,730 | 11/1993 | Steiner et al. . |
| 5,350,225 | 9/1994 | Steiner et al. . |
| 5,367,942 | 11/1994 | Nell et al. . |

(List continued on next page.)

FOREIGN PATENT DOCUMENTS

| 19503076 | * 8/1996 | (DE) | .................................. 303/113.4 |
| WO96/6753 | 3/1996 | (EP) . | |
| 0711695 | 5/1996 | (EP) . | |
| 2282649 | 4/1995 | (GB) . | |
| 228649 | 4/1995 | (GB) . | |
| 2295209 | 5/1996 | (GB) . | |
| 61-268560 | 11/1986 | (JP) . | |
| 3-227766 | 10/1991 | (JP) . | |
| 4-121260 | 4/1992 | (JP) . | |
| 4-121604 | 4/1992 | (JP) . | |
| 5-97022 | 4/1993 | (JP) . | |
| 7-329766 | 12/1995 | (JP) . | |
| 8-32326 | 2/1996 | (JP) . | |
| 8-40229 | 2/1996 | (JP) . | |
| 8-295224 | 11/1996 | (JP) . | |
| WO96/6763 | 3/1995 | (WO) . | |
| WO96/6763 | 3/1996 | (WO) . | |

OTHER PUBLICATIONS

Dec. 1997.*
Chicagoland Final Edition; Transportation; p. 20; User Friendly Technology Helps Keep Drivers In Control, Apr. 1999.*
Cahners Publishing Company Automotive Industries; No. 9 vol. 179; p. 35; New Engineering for the Millenium, Sep. 1999.*

(List continued on next page.)

Primary Examiner—Douglas C. Butler
Assistant Examiner—Devon Kramer
(74) Attorney, Agent, or Firm—Kenyon & Kenyon

(57) ABSTRACT

The present invention relates to a brake force control apparatus performing a brake assist control for generating a brake force larger than that of a normal time when an emergency braking is required and an ABS control. A start condition of the brake assist control may be established due to a vibration of a brake fluid pressure associated with an execution of the ABS control. Accordingly, when the ABS control is being performed, a start of the brake assist control is prohibited (steps 140 and 102). Thereby, the brake assist control is prevented from being frequently started due to the vibration of the brake fluid associated with an execution of the ABS control.

6 Claims, 5 Drawing Sheets

U.S. PATENT DOCUMENTS

| | | |
|---|---|---|
| 5,427,442 | 6/1995 | Heibel . |
| 5,445,444 | 8/1995 | Rump et al. . |
| 5,492,397 * | 2/1996 | Steiner et al. ............... 303/157 |
| 5,496,099 * | 3/1996 | Resch ............... 303/114.1 |
| 5,499,866 | 3/1996 | Brugger et al. . |
| 5,513,906 | 5/1996 | Steiner . |
| 5,535,123 | 7/1996 | Rump et al. . |
| 5,549,369 | 8/1996 | Rump et al. . |
| 5,556,173 | 9/1996 | Steiner et al. . |
| 5,564,797 | 10/1996 | Steiner et al. . |
| 5,567,021 | 10/1996 | Gaillard . |
| 5,584,542 | 12/1996 | Klarer et al. . |
| 5,586,814 * | 12/1996 | Steiner ............... 303/116.2 |
| 5,658,055 | 8/1997 | Dieringer et al. . |
| 5,660,448 | 8/1997 | Kiesewetter et al. . |
| 5,669,769 | 9/1997 | Rump et al. . |
| 5,719,769 | 2/1998 | Brugger et al. . |
| 5,720,532 | 2/1998 | Steiner et al. . |
| 5,722,785 | 3/1998 | Pueschel et al. . |
| 5,772,290 | 6/1998 | Heibel et al. . |
| 5,779,329 | 7/1998 | Takeshima . |
| 5,851,057 | 12/1998 | Terazawa et al. . |
| 5,890,776 | 4/1999 | Sawada . |
| 5,967,624 * | 10/1999 | Graber et al. ............... 303/113.4 |
| 6,120,110 * | 9/2000 | Shimizu ............... 303/113.4 |

OTHER PUBLICATIONS

Toronto Editions; Special Report: Drivers Edge; p. EO9, Feb. 2000.*

Toronto Editions; Special Report: Drivers's Edge; p. E.12; A Soul Soothing Ride; Dec. 1997.*

Copending U.S. application Ser. No. 09/155,769, filed Oct. 22, 1998.

Copending U.S. application Ser. No. 09/171,498, filed Oct. 20, 1998.

Copending U.S. application Ser. No. 09/171,587, filed Oct. 21, 1998.

Copending U.S. application Ser. No. 09/171,582, filed Oct.21, 1998.

Copending U.S. application Ser. No. 09/171,588, filed Oct. 21, 1998.

Copending U.S. application Ser. No. 09/171,589, filed Oct. 21, 1998.

Copending U.S. application Ser. No. 09/171,644, filed Oct. 22, 1998.

Copending U.S. application Ser. No. 09/171,645, filed Oct. 2, 1998.

Copending U.S. application Ser. No. 09/180,014, filed Oct. 29, 1998.

Copending U.S. application Ser. No. 09/194,136, filed Nov. 25, 1998.

Copending U.S. application 09/108,007, filed Jun. 30, 1998.

Copending U.S. application 09/107,771, Jul. 2, 1998.

* cited by examiner

BRAKING FORCE CONTROL APPARATUS

TECHNICAL FIELD

The present invention relates to a brake force control apparatus and, more particularly, to a brake force control apparatus which generates, when an emergency braking is required, a brake force greater than that generated in an ordinary time.

BACKGROUND ART

Conventionally, for example, as disclosed in Japanese Laid-Open Patent Application 4-121260, a brake force control apparatus which generates, when an emergency braking is required, a brake force greater than that generated in a normal time is known. The above-mentioned conventional apparatus comprises a control circuit which generates a drive signal corresponding to an operational speed of a brake pedal and a fluid pressure generating mechanism which generates a brake fluid pressure corresponding to the drive signal generated by the control circuit.

The control circuit determines that, when an operational speed of a brake pedal is less than a predetermined value, the brake pedal is not normally operated. In this case, the fluid pressure generating mechanism is controlled so that a brake fluid pressure corresponding to a brake pressing force is generated. Hereinafter, this control is referred to as a normal control. Additionally, the control circuit determines that, when an operational force of the brake pedal exceeds a predetermined value, an emergency braking is required by the driver. In this case, the fluid pressure generating mechanism is controlled so that a brake fluid pressure is maximized. Hereinafter, this control is referred to as a brake assist control. Thus, according to the above-mentioned conventional apparatus, a brake force corresponding to a brake pressing force can be generated in a normal time, and a large brake force can be immediately generated in an emergency.

Conventionally, in order to prevent a lock of a wheel during a braking operation, an antilock brake control (hereinafter, referred to as an ABS control) is applied to a brake apparatus of a vehicle. The ABS control is for preventing a lock of a wheel by changing a state of a brake force among three states, that is, a pressure-increasing state, a holding state and a pressure-decreasing state so that a slip rate of the wheel does not exceed a predetermined value. Accordingly, when performing the ABS control, a brake force is intermittently changed in association with the changeover among the above-mentioned three states. Thus, when the ABS control is applied to the above-mentioned brake force, a vibration may be generated in a fluid pressure within the apparatus in association with changes in the brake force. If such a vibration is transmitted to a brake pedal, a movement which is not intended by the driver may occur in the brake pedal. In such a condition, it is determined that an emergency braking is required since an operational speed of the brake pedal exceeds a predetermined value despite that the driver does not perform an emergency braking operation, and the brake assist control may be started which results in an incongruous feel provided to the driver. Accordingly, in the above-mentioned conventional apparatus, the brake assist control may be improperly performed due to a vibration in a fluid pressure generated during an execution of the ABS control even when an emergency braking is not required, and, thereby, a riding quality of the vehicle may be deteriorated.

DISCLOSURE OF INVENTION

It is an object of the present invention to provide an improved and useful brake force control apparatus in which the above-mentioned problems are eliminated.

A more specific object of the present invention is to provide a brake force control apparatus which can prevent the brake assist control being improperly executed while the ABS control is executed.

In order to achieve the above-mentioned objects, there is provided according to one aspect of the present invention a brake force control apparatus performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force, characterized by:
    control prohibiting means for determining whether or not the antilock brake control is being performed, and for prohibiting a start of said brake assist control when said antilock brake control is being performed.

When the antilock brake control is being performed, a brake force is intermittently changed. According to the changes in brake force, a vibration is generated in the fluid pressure of the brake force control apparatus. Such a vibration is transmitted to the brake pedal, and a movement of the brake pedal is generated in association with the vibration since the brake pedal is being operated during the ABS is in operation. Accordingly, when the antilock brake control is being performed, there may be a case in which an operational state of the brake pedal satisfies said predetermined condition even when an emergency braking is not required. In the present invention, when the antilock brake control is being performed, a start of the brake assist control is prohibited by the control prohibiting means. Accordingly, the brake assist control is not being performed if the condition for starting the brake assist control is satisfied due to the above-mentioned vibration associated with an execution of the antilock brake control. Thereby, an incongruous feel is prevented from being provided to a driver.

Additionally, there is provided according to another aspect of the present invention a brake force control apparatus performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force, characterized by:
    control prohibiting means for determining whether or not the antilock brake control is being performed, and for prohibiting a start of said brake assist control until a predetermined time has been passed after said antilock brake control is being performed.

When the antilock brake control is started, a controlled state of the brake force control apparatus is changed. According to such a change of the controlled state, a discontinuous change is generated in the fluid pressure of the brake force control apparatus. Accordingly, a vibration is generated in the fluid pressure of the brake force control apparatus. Such a vibration is transmitted to the brake pedal, and a movement of the brake pedal is generated in association with the vibration since the brake pedal is being operated during the ABS is in operation. Accordingly, immediately after the antilock braking operation is started, there may be a case in which an operational state of the brake pedal satisfies said predetermined condition by which the start of the brake assist control is determined even when an emergency braking is not required. In the present invention, when an elapsed time after the antilock brake control is started does not reach the predetermined time, a start of the brake assist control is prohibited by the control prohibiting means. Accordingly, the brake assist control is not being performed if the condition for starting the brake assist control is satisfied due to the above-mentioned vibration associated with an execution of the antilock brake control. Thereby, an incongruous feel is prevented from being provided to a driver.

There is provided according to another aspect of the present invention to provide a brake force control apparatus performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force, characterized by:
control start condition changing means for determining whether or not the antilock brake control is being performed, and for changing said predetermined condition so as to change a condition for starting an execution of the brake assist control.

When the antilock brake control is being performed, a brake force is intermittently changed. According to the changes in brake force, a vibration is generated in the fluid pressure of the brake force control apparatus. Such a vibration is transmitted to the brake pedal, and a movement of the brake pedal is generated in association with the vibration since the brake pedal is being operated during the ABS is in operation. Accordingly, when the antilock brake control is being performed, there may be a case in which an operational state of the brake pedal satisfies said predetermined condition even when an emergency braking is not required. In the present invention, when the antilock brake control is being performed, said predetermined condition is changed toward a rapid braking side. Accordingly, it is prevented that said predetermined condition is satisfied by the above-mentioned vibration associated with an execution of the antilock brake control. That is, an improper execution of the brake assist control can be prevented when an emergency braking is not required while it is prevented that the brake assist control is not performed when an emergency braking is required. Thereby, an incongruous feel is prevented from being provided to a driver.

Additionally, there is provided according to another aspect of the present invention a brake force control apparatus performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force, characterized by:
control start condition changing means for determining whether or not the antilock brake control is being performed, and for changing said predetermined condition until a predetermined time has been passed after said antilock brake control was started so as to change a condition for starting an execution of the brake assist control.

When the antilock brake control is started, a controlled state of the brake force control apparatus is changed. According to such a change of the controlled state, a discontinuous change is generated in the fluid pressure of the brake force control apparatus. Accordingly, a vibration is generated in the fluid pressure of the brake force control apparatus. Such a vibration is transmitted to the brake pedal, and a movement of the brake pedal is generated in association with the vibration since the brake pedal is being operated during the ABS is in operation. Accordingly, immediately after the antilock braking operation is started, there may be a case in which an operational state of the brake pedal satisfies said predetermined condition by which the start of the brake assist control is determined even when an emergency braking is not required. In the present invention, when an elapsed time after the antilock brake control is started does not reach the predetermined time, said predetermined condition is changed toward a rapid braking side. Accordingly, said predetermined condition is not satisfied due to the above-mentioned vibration associated with the start of the antilock brake control. That is, an improper execution of the brake assist control can be prevented when an emergency braking is not required while it is prevented that the brake assist control is not performed when an emergency braking is required immediately after the ABS control is performed. Thereby, an incongruous feel is prevented from being provided to a driver.

Additionally, said predetermined condition may include a threshold value of a pressure of a master cylinder and a threshold value of a rate of change of the pressure, and said predetermined condition may be changed by obtaining correction values and by adding predetermined values to the threshold values, respectively.

Further, a start of the brake assist control may be permitted only when the pressure of the master cylinder is greater than the correction value of the threshold value and the rate of change is greater than the correction value of the threshold value.

Other objects, features and advantages of the present invention will become more apparent from the following detailed description when read in conjunction with the accompanying drawings.

BEST MODE FOR CARRYING OUT THE INVENTION

Figure 1:
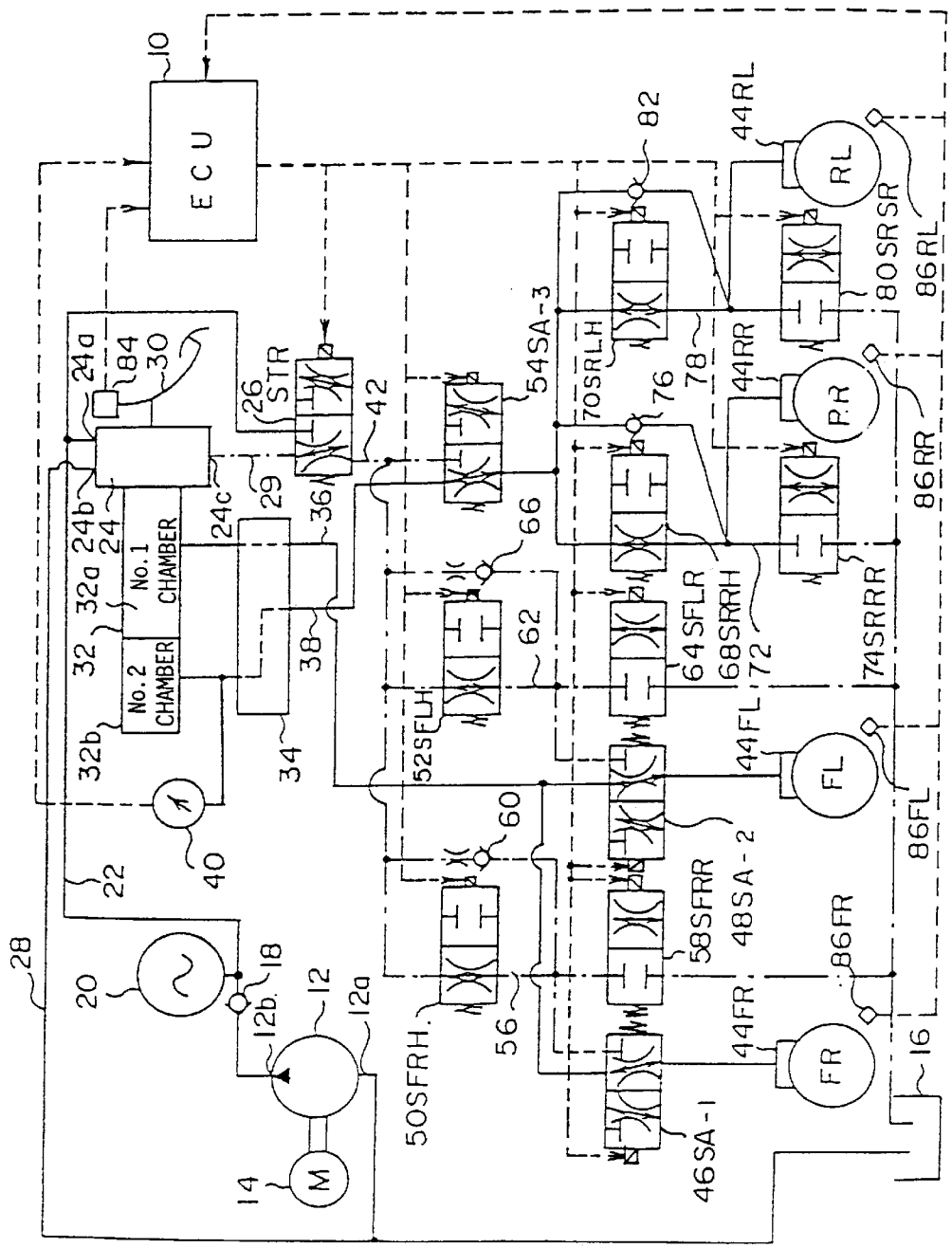
FIG. 1 is a system structure diagram of a brake force control apparatus according to an embodiment of the present invention.

FIG. 1 is a system structure diagram of a brake force control apparatus according to an embodiment of the present invention. The brake force control apparatus shown in FIG. 1 is controlled by an electronic control unit 10 (hereinafter, referred to as ECU 10). The brake force control apparatus comprises a pump 12. The pump 12 has a motor 14 as a power source thereof. An inlet port 12a of the pump 12 communicates with a reservoir tank 16. An accumulator 20 communicates with an outlet port 12b of the pump via a check valve 18. The pump 12 delivers brake fluid in the reservoir tank 16 from the outlet port 12b so that a predetermined pressure is always accumulated in the accumulator 20.

The accumulator 20 communicates with a high-pressure port 24a of a regulator 24 via a high-pressure passage 22, and communicates with a regulator switching solenoid 26 (hereinafter, referred to as STR 26). The regulator 24 has a low-pressure port 24b and a control fluid pressure port 24c. The low-pressure port 24b communicates with the reservoir tank 16 via a low-pressure passage 28. The control fluid pressure port 24c communicates with the STR 26 via a control fluid pressure passage 29. The STR 26 is a two-position solenoid valve which selectively set one of the control fluid pressure passage 29 and the high-pressure passage 22 in a conductive state, and sets the control fluid pressure passage 29 in a conductive state and sets the high-pressure passage in a closed state in a normal state. Hereinafter, the two-position solenoid valve means a solenoid valve which can be set to two states.

A brake pedal 30 is connected to the regulator 24, and a master cylinder is mounted to the regulator 24. The regulator 24 has a fluid pressure chamber therein. The fluid pressure chamber is always communicated with the control fluid pressure port 24c, and is selectively communicated with the high-pressure port 24a or the low-pressure port 24b in accordance with an operational state of the brake pedal 30. The regulator 24 is configured so that a pressure inside the fluid pressure chamber is adjusted to a fluid pressure corresponding to a brake pressing force $F_P$ exerted on the brake pedal 30. Accordingly, the fluid pressure corresponding to the brake pressing force $F_P$ always appears at the control fluid pressure port 24c of the regulator 24. Hereinafter, this fluid pressure is referred to as a regulator pressure $P_{RE}$.

The brake pressing force $F_P$ exerted on the brake pedal 30 is mechanically transmitted to a master cylinder 32 via the regulator 24. Additionally, a force corresponding to the fluid pressure inside the fluid pressure chamber of the regulator 24, that is, a force corresponding to the regulator pressure $P_{RE}$, is transmitted to the master cylinder 32.

The master cylinder 32 is provided with a first fluid pressure chamber 32a and a second fluid pressure chamber 32b therein. A master cylinder pressure $P_{M/C}$ corresponding to a resultant force of the brake pressing force $F_P$ and a brake assist force $F_A$ is generated in the first fluid pressure chamber 32a and the second fluid pressure chamber 32b. Both the master cylinder pressure $P_{M/C}$ generated in the first fluid pressure chamber 32a and the master cylinder pressure $P_{M/C}$ generated in the second fluid pressure chamber 32b are supplied to a proportioning valve 34 (hereinafter, referred to as P valve 34).

The P valve 34 communicates with a first fluid pressure passage 36 and a second fluid pressure passage 38. The P valve 34 supplies the master cylinder pressure $P_{M/C}$ to the first fluid pressure passage 36 and the second fluid pressure passage 38 without change in a range where the master cylinder pressure $P_{M/C}$ is less than a predetermined value. Additionally, the P valve 34 supplies the master cylinder pressure $P_{M/C}$ to the first fluid pressure passage 36 without change and supplies a fluid pressure obtained by decreasing the master cylinder pressure $P_{M/C}$ by a predetermined ratio to the second fluid pressure passage 38 in a range where the master cylinder pressure $P_{M/C}$ is less than a predetermined value.

A hydraulic pressure sensor 40, which outputs an electric signal corresponding to the master cylinder pressure $P_{M/C}$, is provided to a passage between the second fluid pressure chamber 32b of the master cylinder 32 and the P valve 34. An output signal of the hydraulic pressure sensor 40 is supplied to the ECU 10. The ECU 10 detects the master cylinder pressure $P_{M/C}$ generated in the master cylinder 32 based on the output signal of the hydraulic pressure sensor 40.

The above-mentioned STR 26 communicates with a third fluid pressure passage 42. The third fluid pressure passage 42 is communicating with one of the control fluid pressure passage 29 and the high-pressure passage 22 in accordance with a state of the STR 26. In the present embodiment, wheel cylinders 44FL and 44FR provided to left and right front wheels FL and FR are provided with a brake fluid pressure from the first fluid pressure passage 36 communicated with the P valve 34 or the third fluid pressure passage 42 communicated with the STR 26. Additionally, wheel cylinders 44RL and 44RR provided to left and right rear wheels RL and RR are provided with a brake fluid pressure from the second fluid pressure passage 38 communicated with the P valve 34 or the third fluid pressure passage 42 communicated with the STR 26.

The first fluid pressure passage 36 communicates with a first assist solenoid valve 46 (hereinafter referred to as SA-1 46) and a second assist solenoid valve 48 (hereinafter, referred to as SA-2 48). On the other hand, the third fluid pressure passage 42 communicates with a right front holding solenoid valve 50 (hereinafter, referred to as SFRH 50), a left front holding solenoid valve 52 (hereinafter, referred to as SFLH 52) and a third assist solenoid valve 54 (hereinafter, referred to as SA-3 54). In this specification, the term solenoid means a solenoid valve.

The SFRH 50 is a two-position solenoid valve which maintains an open state in a normal state. The SFRH 50 communicates with the SA-1 46 and a right front wheel pressure decreasing solenoid valve 58 (hereinafter, referred to as SFRR 58) via a pressure adjusting fluid pressure passage 56. A check valve 60 permitting a fluid flow only in a direction from the pressure adjusting fluid pressure passage 56 to the third fluid pressure passage 42 is provided, in parallel, between the third fluid pressure passage 42 and the pressure adjusting fluid pressure passage 56.

The SA-1 46 is a two-position solenoid valve which selectively renders one of the first fluid pressure passage 36 and the pressure adjusting fluid pressure passage 56 to communicate with the wheel cylinder 44FR, and renders the first fluid pressure passage 36 and the wheel cylinder 44FR to be in a communicating state in a normal state (OFF state). On the other hand, the SFRR 58 is a two-position solenoid valve which renders the pressure adjusting fluid pressure passage 56 and the reservoir tank 16 to be in a connected state or a disconnected state. The SFRR 58 renders the pressure adjusting fluid pressure passage 56 and the reservoir tank 16 to be in a disconnected state in a normal state (OFF state).

The SFLH 52 is a two-position solenoid valve which maintains an open state in a normal state. The SFLH 52 communicates with the SA-2 48 and a left front wheel pressure decreasing solenoid valve 64 (hereinafter, referred to as SFLR 64) via a pressure adjusting fluid pressure passage 62. A check valve 66 permitting a fluid flow only in a direction from the pressure adjusting fluid pressure passage 62 to the third fluid pressure passage 42 is provided, in parallel, between the third fluid pressure passage 42 and the pressure adjusting fluid pressure passage 62.

The SA-2 48 is a two-position solenoid valve which selectively renders one of the first fluid pressure passage 36 and the pressure adjusting fluid pressure passage 62 to communicate with the wheel cylinder 44FL, and renders the first fluid pressure passage 36 and the wheel cylinder 44FL to be in a communicating state in a normal state (OFF state). On the other hand, the SFLR 64 is a two-position solenoid valve which renders the pressure adjusting fluid pressure passage 62 and the reservoir tank 16 to be in a connected state or a disconnected state. The SFLR 64 renders the pressure adjusting fluid pressure passage 62 and the reservoir tank 16 to be in a disconnected state from each other in a normal state (OFF state).

The second fluid pressure passage 38 communicates with the above-mentioned SA-3 54. The downstream side of the SA-3 54 communicates with a right rear wheel holding solenoid valve 68 (hereinafter, referred to as SRRH 68) provided in correspondence with a wheel cylinder 44RR of the right rear wheel RR and a left rear wheel holding solenoid valve 70 (hereinafter, referred to as SRLR 70) provided in correspondence with a wheel cylinder 44RL of the left rear wheel RL. The SA-3 54 is a two-position solenoid valve which selectively selectively renders one of the second fluid pressure passage 38 and the third fluid pressure passage 42 to communicate with the SRRH 68 and the SRLR 70, and renders the second fluid pressure passage 38, the SRRH 68 and the SRLR 70 in a communicating state in a normal state (OFF state).

The downstream side of the SRRH 68 communicates with the wheel cylinder 44RR and a right rear wheel pressure decreasing solenoid valve 74 (hereinafter, referred to as SRRR 74) via a pressure adjusting fluid pressure passage 72. The SRRR 74 is a two-position solenoid valve which renders the pressure adjusting fluid pressure passage 72 and the reservoir tank 16 in a communicating state or a disconnected state, and renders the pressure adjusting fluid pressure passage 72 and the reservoir tank 16 in the disconnected state in a normal state (OFF state). Additionally, a check valve 76 permitting a fluid flow only in a direction from the pressure adjusting fluid pressure passage 72 to the SA-3 54 is provided, in parallel, between the SA-3 54 and the pressure adjusting fluid pressure passage 72.

Similarly, the downstream side of the SRLH 70 communicates with the wheel cylinder 44RL and a left rear wheel pressure decreasing solenoid valve 80 (hereinafter, referred to as SRLR 80) via a pressure adjusting fluid pressure passage 78. The SRLR 80 is a two-position solenoid valve which renders the pressure adjusting fluid pressure passage 78 and the reservoir tank 16 in a communicating state or a disconnected state, and renders the pressure adjusting fluid pressure passage 78 and the reservoir tank 16 in the disconnected state in a normal state (OFF state). Additionally, a check valve 82 permitting a fluid flow only in a direction from the pressure adjusting fluid pressure passage 78 to the SA-3 54 is provided, in parallel, between the SA-3 54 and the pressure adjusting fluid pressure passage 78.

In the system according to the present embodiment, a brake switch 84 is provided near the brake pedal 30. The brake switch 84 is a switch that generates an ON output when the brake pedal 30 is pressed. The output signal of the brake switch 84 is supplied to the ECU 10. The ECU 10 determines whether or not a braking operation is performed by the driver based on the output signal of the brake switch 84.

Additionally, in the system according to the present embodiment, wheel speed sensors 86FL, 86FR, 86RL and 86RR (hereinafter, these are referred to as **86\*\* as a whole) are provided near the left and right front wheels FL and FR and the left and right rear wheels RL and RR, each of the sensors generating a pulse signal when the respective wheel rotates a predetermined angle. The output signals of the wheel speed sensors 86\*\* are supplied to the ECU 10. The ECU 10 detects a wheel speed of each of the wheels FL, FR, RL and RR based on the output signals of the wheel speed sensors 86\*\***.

The ECU 10 supplies, if necessary, drive signals to the above-mentioned STR 26, SA-1 46, SA-2 48, SA-3 54, SFRH 50, SFLH 52, SFRR 58, SFLR 64, SRRH 68, SRLH 70, SRRR 74 and SRLR 80 based on the output signal of the brake switch 84.

A description will now be given of an operation of the brake force control apparatus according to the present embodiment. The brake force control apparatus according to the present embodiment performs the normal control for generating a brake force corresponding to the brake pressing force FP exerted on the brake pedal 30 when the vehicle is in a stable state. The normal control can be achieved, as shown in FIG. 1, by turning off all of the STR 26, SA-1 46, SA-2 48, SA-3 54, SFRH 50, SFLH 52, SFRR 58, SFLR 64, SRRH 68, SRLH 70, SRRR 74 and SRLR 80 based on the output signal of the brake switch 84.

That is, in the state shown in FIG. 1, the wheel cylinders 44FR and 44FL communicate with the first fluid pressure passage 36, and the wheel cylinders 44RR and 44RL communicate with the second fluid pressure passage 38. In this case, the brake fluid flows between the master cylinder 32 and the wheel cylinders 44FR, 44FL, 44RL and 44RR (hereinafter, these may be referred to as **44\*\*** as a whole), and a brake force corresponding to the brake pressing force FP is generated in each of the wheels FL, FR, RL and RR.

In the present embodiment, when a possibility for shifting to a locked state is detected in one of the wheels, it is determined that a condition for performing an antilock brake control (hereinafter, referred to as ABS control) is established. The ECU 10 calculates wheel speeds $V_{WFL}$, $V_{WFR}$, $V_{WRL}$ and $V_{WRR}$ (hereinafter, these are referred to as $V_W$ as a whole) of the wheels based on output signals of the wheel speed sensors 86\*\***, and calculates an assumed value $V_{SO}$ (hereinafter, referred to as an assumed vehicle speed $V_{SO}$) of a speed of the vehicle according to a publicly known method. Then, when the vehicle is in a braking state, a slip rate S of each wheel is calculated according to the following equation so as to determine that the wheel may shift to a locked state when the slip rate S exceeds a predetermined value.

$$S = (V_{SO} - V_W**) \cdot 100 / V_{SO} \qquad (1)$$

when the condition for performing the ABS control is established for one of the wheels, the ECU 10 outputs the drive signals to the SA-1 46, SA-2 48 and SA-3 54 corresponding to the wheel of which condition for performing the ABS is established. It should be noted that the ABS control can be individually performed for the left and right wheels with respect to the front wheels, and the ABS control is performed commonly for the left and write wheels with respect to the rear wheels. If the execution condition for the ABS control is established for the right front wheel and, thus, the SA-1 46 is turned on the wheel cylinder 44FR is disconnected from the first fluid pressure passage 36 and connected to the pressure adjusting fluid pressure passage 56. Additionally, if the execution condition for the ABS control is established for the left front wheel and, thus, the SA-2 48 is turned on, the wheel cylinder 44FL is disconnected from the first fluid pressure passage 36 and connected to the pressure adjusting fluid pressure passage 62. Further, if the execution condition for the ABS control is established for the left rear wheel and the right rear wheel and, thus, the SA-3 54 is turned on, the upstream side of the SRRH 68 and the SRLH 70 is disconnected from the second fluid pressure passage 38 and connected to the third fluid pressure passage 42.

In this case, all wheel cylinders 44 on which the ABS control is performed communicate with respective holding solenoid valves SFRH 50, SFLH 52, SRRH 68 and SRLH 70 (hereinafter, these are referred to as holding solenoid SH) and respective pressure decreasing solenoid valves SFRR 58, SFLR 64, SRRR 74 and SRLR 80 (hereinafter, these are referred to as pressure decreasing solenoid SR), and a regulator pressure PRE is introduced to the upstream side of each of the holding solenoids SH via the third fluid pressure passage 42 and the STR 26.

In the above-mentioned condition, a wheel cylinder pressure $P_{W/C}$ of the respective wheel cylinders 44 is increased with the regulator pressure PRE as an upper limit by the holding solenoids SH being in an open state and the pressure decreasing solenoids SR being in a closed state. Hereinafter, this state is referred to as a pressure increasing mode ①. Additionally, the wheel cylinder pressure $P_{W/C}$ of the respective wheel cylinders 44 is maintained without being increased or decreased by the holding solenoids SH being in a closed state and the pressure decreasing solenoids SR being in the closed state. Hereinafter, this state is referred to as a holding mode ②. Further, the wheel cylinder pressure $P_{W/C}$ of the respective wheel cylinders 44 is decreased by the holding solenoids SH being in the closed state and the pressure decreasing solenoids S**R being in the open state. Hereinafter, this state is referred to as a pressure decreasing mode ③. The ECU 10 achieves, if necessary, the above-mentioned pressure-increasing mode ①, holding mode ② and pressure-decreasing mode ③ so that a slip rate S of each wheel during a braking time becomes an appropriate value, that is, so that each wheel does not shift to the locked state.

When a depression of the brake pedal 30 is released by the driver during execution of the ABS control, the wheel cylinder pressure $P_{W/C}$ must be immediately decreased. In the system according to the present embodiment, the check valves 60, 66, 76 and 82 are provided in hydraulic pressure paths corresponding to each of the wheel cylinders 44, each of the check valves 60, 66, 76 and 82 permitting a fluid flow only in the directions from the wheel cylinders 44 to the third fluid pressure passage 42. Thus, according to the system of the present embodiment, the wheel cylinder pressures $P_{W/C}$ of all of the wheel cylinders 44** can be immediately decreased after the depression of the brake pedal 30 is released.

In the system according to the present embodiment, when the ABS control is performed, the wheel cylinder pressure $P_{W/C}$ is increased by the brake fluid being supplied from the regulator 24 to the wheel cylinders 44, that is, by the brake fluid being supplied from the pump 12 to the wheel cylinders 44, and is decreased by the brake fluid in the wheel cylinders 44** flowing to the reservoir tank 16. When the increase in the wheel cylinder pressure $P_{W/C}$ is performed by using the master cylinder 32 as a fluid pressure source and if the pressure increasing mode and the pressure decreasing mode are repeatedly performed, the brake fluid in the master cylinder 32 gradually decreases and a so-called bottoming of the master cylinder may occur.

On the other hand, if the pump 12 is used as a fluid pressure source so as to increase the wheel cylinder pressure $P_{W/C}$, as in the system according to the present embodiment, such a bottoming can be prevented. Thus, in the system according to the present embodiment, a stable operational state can be maintained if the ABS control is continued for a long time.

In the system according to the present embodiment, the ABS control is started when a possibility for shifting to the locked state is detected in one of the wheels. Accordingly, in order to start the ABS control, as a precondition, a braking operation having a level at which a large slip rate S is generated in one of the wheels must be performed.

Figure 2:
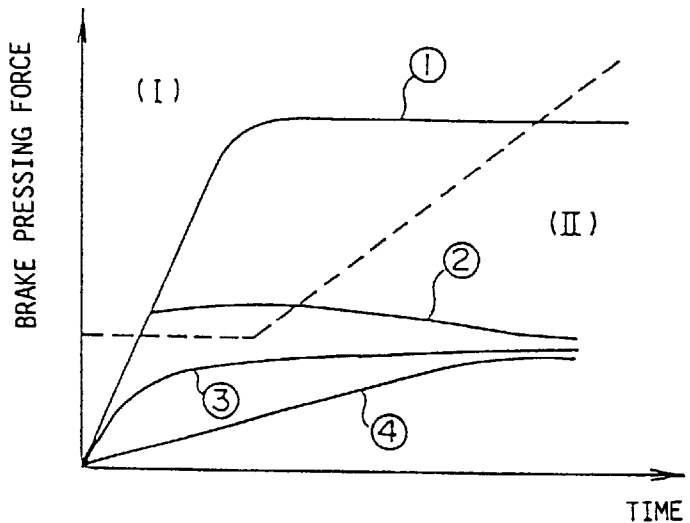
FIG. 2 is an illustration for showing a change in a brake pressing force achieved under various circumstances.

A description will now be given of an operation of the system according to the system of the present embodiment with respect to an emergency braking operation. FIG. 2 shows changes in the brake pressing force $F_P$ applied to the brake pedal 30 with respect to time under various conditions. Curves indicated by ① and ② in FIG. 2 represent changes in the pressing force $F_P$ when an emergency braking is performed by a highly skilled driver (hereinafter, referred to as a high-grade driver) and an unskilled driver or a driver lacking strength (hereinafter, referred to as a beginner-grade driver), respectively. The emergency braking operation is an operation performed when is it desired to rapidly decelerate a vehicle. Accordingly, the brake pressing force associated with the emergency braking operation is preferably a force sufficiently large as the ABS control is performed.

As shown by the curve ①, when the driver of the vehicle is a high-grade driver, the brake pressing force $F_P$ is immediately and rapidly increased in response to establishment of a condition in which an emergency braking is required, and a large brake pressing force $F_P$ can be maintained for a long time. If such a brake pressing force $F_P$ is exerted on the brake pedal 30, a sufficiently high brake fluid pressure can be provided from the master cylinder 32 to each of the wheel cylinders 44** so as to start the ABS control, and rapid braking can be achieved.

However, as shown by the curve ② when the driver of the vehicle is a beginner-grade driver, the brake pressing force $F_P$ may not be increased to a sufficiently high value in response to establishment of the condition in which an emergency braking is required. If the brake pressing force $F_P$ exerted on the brake pedal 30 is not sufficiently increased as shown by the curve ② after an emergency braking is required, the wheel cylinder pressure $P_{W/C}$ in each of the wheels 44** is not sufficiently increased, which results in a possibility that the ABS control is not started.

As mentioned above, when the driver of the vehicle is a beginner-grade driver, the braking ability of the vehicle may not be sufficiently performed even when an emergency braking operation is performed despite that the vehicle has a good braking ability. Accordingly, the system according to the present embodiment is provided with a brake assist function for sufficiently increasing the wheel cylinder pressure $P_{W/C}$ even if the brake pressing force $F_P$ is not sufficiently increased when the brake pedal is operated with an intention to perform an emergency braking. Hereinafter, a control performed by the ECU 10 to achieve such a function is referred to as a brake assist control.

In the system according to the present embodiment, when performing the brake assist control, an accurate determination must be made as to whether, when the brake pedal 30 is operated, the operation is intended to perform an emergency braking operation or to perform a regular braking operation.

Curves indicated by shown ③ and ④ in FIG. 2 show changes in the brake pressing force $F_P$ when the driver operates the brake pedal with an intention to perform a normal braking operation under various conditions. As shown by the curves ①  to ④, a change in the brake pressing force $F_P$ associated with the normal braking operation is gentle as compared to a change in the brake pressing force $F_P$ associated with an emergency braking operation. Additionally, a convergent value of the brake pressing force $F_P$ associated with the normal braking operation is not so large as a convergent value of the brake pressing force $F_P$ associated with an emergency braking operation.

Giving attention to those differences, when the brake pressing force $F_P$ is increased to a sufficiently large value at a rate of change exceeding a predetermined value after a braking operation is started, that is, when the brake pedal 30 is operated so that the brake pressing force $F_P$ reaches an area indicated by (I) in FIG. 2, it can be determined that an emergency braking is performed.

Additionally, when the rate of change of the brake pressing force $F_P$ is smaller than the predetermined value or when the convergent value of the brake pressing force $F_P$ is smaller than the predetermined value, that is, when the brake pedal 30 is operated so that the brake pressing force $F_P$ always changes within an area indicated by (II) in FIG. 2, it can be determined that a normal braking operation is performed.

Accordingly, in the system according to the present embodiment, an operational speed and an amount of operation of the brake pedal are detected or assumed, and, then, it is determined whether or not the operational speed exceeds a predetermined value and whether or not the amount of operation exceeds a predetermined value, and, thereby, it can be determined whether or not the operation on the brake pedal 30 is intended to perform an emergency braking.

In the vehicle provided with the brake force control apparatus according to the present embodiment, the brake pedal 30 is operated by being pressed. An operational speed of the brake pedal 30 approximately corresponds to a rate of change in the brake pressing force $F_P$. Additionally, an amount of operation of the brake pedal 30 approximately corresponds to a value of the brake pressing force $F_P$. Accordingly, the operational speed and the amount of operation of the brake pedal 30 can be accurately assumed from the brake pressing force $F_P$.

When the brake pressing force $F_P$ is exerted on the brake pedal 30, a stroke corresponding to the brake pressing force $F_P$ is generated in the brake pedal 30. Additionally, when the stroke L is generated in the brake pedal 30, a master cylinder pressure $P_{M/C}$ corresponding to the stroke L, which corresponds to the brake pressing force $F_P$ is generated in the master cylinder 32. When the master cylinder pressure $P_{M/C}$ corresponding to the brake pressing force $F_P$ is generated, a vehicle deceleration G corresponding to the brake pressing force $F_P$ is generated in the vehicle. Accordingly, an operational speed and an amount of operation of the brake pedal 30 can be assumed from parameters including ② the pedal stroke L, ③ the master cylinder pressure $P_{M/C}$, ④ the vehicle deceleration G, ⑤ the assumed vehicle speed $V_{SO}$ and ⑥ the wheel speed $V_W**$, other than the above-mentioned ① brake pressing force $F_P$.

In order to accurately assume an operational speed and an amount of operation of the brake pedal 30, that is, in order to accurately discriminate an emergency braking and a normal brake, it is preferable that parameters (hereinafter, referred to as basic parameters) be detected at a position closer to the foot of the driver. According to such a pint of view, the parameters ① to ⑥ have a superiority in the order of ①→⑥ when used as the basic parameters.

In order to detect ① the brake pressing force $F_P$, it is required to provide (i) a pressing force sensor. Additionally, in order to detect ② the pedal stroke L, it is required to provide (ii) a stroke sensor. Similarly, in order to detect ③ the master cylinder pressure $P_{M/C}$ and ④ the vehicle deceleration G, it is required to provide a (iii) a hydraulic pressure sensor and (iv) a deceleration sensor, respectively. Further, in order to detect ⑤ the assumed vehicle speed $V_{SO}$ and ⑥ the wheel speed $V_W**$, it is required to provide (v) a wheel speed sensor.

The (v) wheel speed sensor and the (iv) deceleration sensor among the above-mentioned sensors (i) to (v) are conventionally and widely used sensors for a vehicle. On the other hand, the (ii) stroke sensor and the (i) pressing force sensor are not popular sensors for a vehicle. Accordingly, considering a cost merit of a sensor due to a mass production effect, the above-mentioned sensors (i) to (v) have a superiority in the order of (v)→(i).

In the system according to the present embodiment, considering the above-mentioned merit and demerit, the hydraulic pressure sensor 40 is used as a sensor for detecting the basic parameters so as to discriminate an emergency braking operation and a normal braking operation by using the master cylinder pressure $P_{M/C}$ as a basic parameter. A description will now be given of an operation of the system according to the present embodiment when it is determined by the ECU 10 that an emergency braking is performed.

The ECU 10 determines that an emergency braking is performed when the master cylinder pressure $P_{M/C}$ exceeding the predetermined value is detected and a rate of change $\Delta P_{M/C}$ is detected after the brake pedal 30 is pressed. When it is determined that an emergency braking is performed, the ECU 10 outputs the drive signals to the STR 26, the SA-1 46, the SA-2 48 and the SA-3 54.

When the STR 26 is turned on upon receipt of the above-mentioned drive signal, the third fluid pressure passage 42 and the high-pressure passage 22 are directly connected to each other. In this case, an accumulator pressure $P_{ACC}$ is introduced into the third fluid pressure passage 42. Additionally, when the SA-1 46 and the SA-2 48 are turned on upon receipt of the drive signals, the wheel cylinders 44FR and 44FL communicate with the pressure adjusting fluid pressure passages 56 and 62, respectively. Further, when the SA-3 54 is turned on upon receipt of the above-mentioned drive signal, the upstream side of the SRRH 68 communicates with the third fluid pressure passage 42. In this case, a state is established in which all of the wheel cylinders 44 communicate with the respective holding solenoids SH and the respective pressure decreasing solenoids SR and the accumulator pressure $P_{ACC}$ is introduced to the upstream side of each of the holding solenoids SH.

In the ECU 10, all of the holding solenoids SH and all of the pressure decreasing solenoids SR are maintained in the OFF state immediately after execution of an emergency braking is detected. Accordingly, as mentioned above, when the accumulator pressure $P_{ACC}$ is introduced to the upstream side of the holding solenoids SH, the fluid pressure is provided to the wheel cylinders 44 without being changed. As a result, the wheel cylinder pressure $P_{W/C}$ of all of the wheel cylinders 44** is increased toward the accumulator pressure $P_{ACC}$.

As mentioned above, according to the system of the present embodiment, when an emergency braking is performed, the wheel cylinder pressure $P_{W/C}$ of all of the wheel cylinders 44** can be immediately increased irrespective of a magnitude of the brake pressing force $F_P$. Thus, according to the system of the present embodiment, a large brake force can be generated immediately after establishment of a condition in which an emergency braking is required, even if the driver is a beginner-grade driver.

It should be noted that when the ABS control is performed subsequent to an emergency braking operation, the wheel cylinder pressure $P_{W/C}$ is increased by using the pump 12 and the accumulator 20 as a fluid pressure source, and is decreased by the brake fluid in the wheel cylinders 44** flowing to the reservoir tank 16. Accordingly, if the pressure increasing mode and the pressure decreasing mode are repeated, a so-called bottoming of the master cylinder 32 does not occur.

When the brake assist control is started as mentioned above by execution of an emergency braking operation, the brake assist control must be ended when a press of the brake pedal 30 is released. In the system according to the present invention, as mentioned above. the STR 26, the SA-1 46, the AS-2 48 and the SA-3 54 are maintained to be in the ON state. Then the STR 26, the SA-1 46, the AS-2 48 and the SA-3 54 are in the ON state, each of the fluid pressure chamber in the regulator 24 and the first fluid pressure chamber 32a and the second fluid pressure chamber 32b becomes substantially a closed space.

Under the above-mentioned condition, the master cylinder pressure $P_{M/C}$ becomes a value corresponding to the brake pressing force $F_P$. Accordingly, by monitoring the output signal of the master cylinder pressure $P_{M/C}$ detected by the hydraulic pressure sensor 40, it can be easily determined whether or not a depression of the brake pedal 30 is has been released. When the release of the press of the brake pedal 30 is detected, the ECU 10 stops the supply of the drive signals to the STR 26, the SA-1 46, the SA-2 48 and the SA-3 54 so as to perform the normal control.

As for the basic parameters which are the base of discrimination for an emergency braking and a normal brake, ① the brake pressing force $F_P$, ② the pedal stroke L, ④ the vehicle deceleration G, ⑤ the assumed vehicle speed $V_{SO}$ and ⑥ the wheel speed $V_W$** other than the above-mentioned ③ master cylinder pressure $P_{M/C}$ may be applicable. Among those parameters, the ① brake pressing force $F_P$ and ② the pedal stroke L are parameters that are sensitive to a change in the brake pressing force $F_P$, similar to ③ the master cylinder pressure $P_{M/C}$. Accordingly, when ① the brake pressing force $F_P$ or ② the pedal stroke L are used as a basic parameters, it can be easily determined whether or not the press of the brake pedal 30 is released by monitoring the parameter.

On the other hand, the parameters ④ to ⑥ vary when a brake force of each wheel is changed. If the depression of the brake pedal 30 is released, there is no large changes generated in these parameters. Accordingly, when the parameters ④ to ⑥ are used as the basic parameter, it is effective to perform a determination for a termination of the brake assist control based on the output state of a pressing force switch that is provided for detecting whether or not the brake pressing force $F_P$ is applied.

As mentioned above, when the ABS control is started, the SA-1 46, the SA-2 48 or the SA-3 54 is changed to the ON state. In this case, the communication between the wheel cylinder FR44 or FL 44 and the first fluid pressure chamber 32a of the mater cylinder 32 is interrupted by the SA-1 46 or the SA-2 48 being changed to the ON state. The communication between the wheel cylinder RR44 or RL44 and the second fluid pressure chamber 32b of the mater cylinder 32 is interrupted by the SA-3 54 being changed to the ON state. As mentioned above, when the ABS control is started, the communication between each fluid pressure chamber and the respective wheel cylinders 44** is interrupted.

Accordingly, the brake fluid in each fluid pressure chamber of the master cylinder 32 tends to be hardly consumed, and an increasing slope $dP_{M/C}$ of the master cylinder pressure $P_{M/C}$ with respect to the brake pedal 30 is discontinuously increased.

Generally, the ABS control is started when the driver presses a brake pedal with a pressing force exceeding a certain level. In this case, generally, the driver tends to press the brake pedal at a constant speed. Accordingly, if an increasing slope $dP_{M/C}$ of the master cylinder pressure $P_{M/C}$ is discontinuously increased in the middle of a pressing operation on the brake pedal 30, the driver cannot respond instantaneously to such a discontinuous increase and the master cylinder pressure $P_{M/C}$ is temporarily increased. Additionally, the above-mentioned discontinuous increase is transmitted to the driver as a shock. This shock causes a vibratory change in the motion of the brake pedal. As a result, the vibration is superimposed on the master cylinder pressure $P_{M/C}$, and the master cylinder pressure $P_{M/C}$ and the rate of change $\Delta P_{M/C}$ of the master cylinder pressure are increased. As mentioned above, the brake assist control is performed when $P_{M/C}$ and $\Delta P_{M/C}$ exceed the predetermined values, respectively. Accordingly, if $P_{M/C}$ increases in association with a start of the ABS control, $P_{M/C}$ and $\Delta P_{M/C}$ exceed the predetermined values, respectively, and the start condition of the brake assist control may be satisfied.

Additionally, as mentioned above, when the ABS control is being performed, an ON/OFF state of each of the holding solenoid SH and the pressure-decreasing solenoid SR is changed at a short period. Thus, a vibration is generated in the fluid pressure of the brake force control apparatus due to the change in the valves. Such a vibration is transmitted to the master cylinder 32, and is superimposed on the master cylinder pressure $P_{M/C}$. Accordingly, the master cylinder pressure $P_{M/C}$ and the rate of change $\Delta P_{M/C}$ of the master cylinder pressure exceed the above-mentioned predetermined values, respectively, and the start condition of the brake assist control may be satisfied.

As mentioned above, immediately after a start of the ABS control and when the ABS control is being performed, the start condition of the brake assist control may be established due to an increase in $P_{M/C}$ and $\Delta P_{M/C}$ unless an emergency braking operation is not being performed. If the brake assist control is started in such a condition, a high pressure in the accumulator 20 is intermittently provided to the wheel cylinder 44**. Accordingly, the ABS control is performed with a large brake force. This gives the driver an incongruous feel, and deteriorates a riding quality of the vehicle.

The brake force control apparatus according to the present embodiment has a feature that an improper execution of the brake assist control is prevented when an emergency braking operation is not being performed when the ABS control is being performed, and, thereby preventing an incongruous feel being given to the driver. A description will now be given, with reference to FIG. 3, of contents of a process performed by the ECU to achieve the above-mentioned function.

Figure 3:
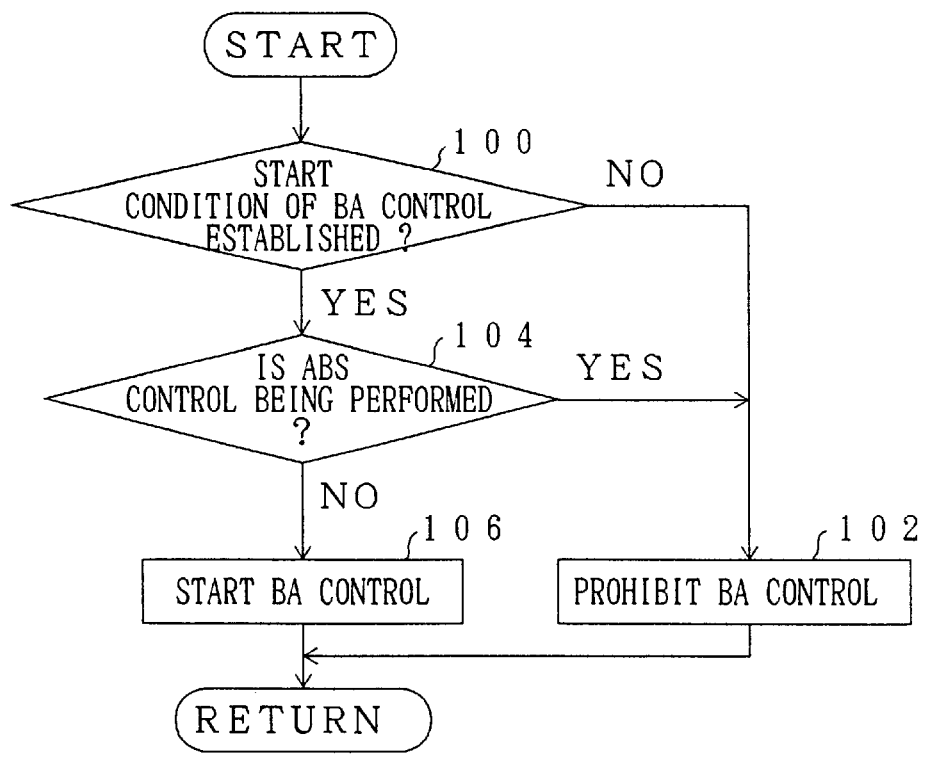
FIG. 3 is a flowchart of a routine performed in the brake force control apparatus shown in FIG. 1.

FIG. 3 is a flowchart of an example of a control routine performed by the ECU 10. It should be noted that the routine shown in FIG. 3 is a periodic interruption routine started at every predetermined timed. When the routine shown in FIG. 3 is started, the process of step 100 is performed first.

In step 100, it is determined whether or not the start condition of the brake assist control is established. This determination is made by determining whether or not the master cylinder pressure $P_{M/C}$ and the rate of change $\Delta P_{M/C}$ of the master cylinder pressure exceed the predetermined values, respectively. If it is determined, in step 100, that the start condition of the brake assist control is not established, the process of step 102 is performed. In step 102, execution of the brake assist control is prohibited. After the process of step 102 is completed, the routine at this time is ended.

On the other hand, if it is determined that the start condition of the brake assist control is established, the process of step 104 is then performed. In step 104, it is determined whether or not the ABS control is being performed in one of the wheels. If it is determined, in step 104, that the ABS control is performed in one of the wheels, the process of step 102 is performed and, then, the process at this time is ended. Thus, according to the present routine, when the ABS control is performed in one of the wheels, an execution of the brake assist control is prohibited even if the start condition of the brake assist control is established. If it is determined, in step 104, that the ABS control is not performed in any one of the wheels, the process of step 106 is performed.

In step 106, the brake assist control is started. As mentioned above, the brake assist control is started by outputting the drive signals to the STR 26, the SA-1 46, the SA-2 48 and the SA-3 54. Thereafter, the brake assist control is continued until the depression of the brake pedal 30 is released and the master cylinder pressure $P_{M/C}$ is decreased. After the process of step 106 is completed, the routine at this time is ended.

As mentioned above, in the system according to the present embodiment, the brake assist control is prohibited when the ABS control is being performed. Accordingly, it is prevented that the start condition of the brake assist control is satisfied due to a vibration associated with an execution of the ABS control. Thus, according to the system of the present embodiment, an execution of the brake assist control is prevented from being improperly executed, and, thereby, an incongruous feel is prevented from being given to the driver.

It should be noted that the ABS control is started when a possibility is detected that one of the wheels shifts to a locked state. That is, when the ABS control is being performed, a large brake force having a degree such that a large slip is generated is applied to one of the wheels. Accordingly, when an emergency braking is required when the ABS control is being performed, necessity to start the brake assist control is small. Thus, if a start of the brake assist control is prohibited when the ABS control is being performed, there is no considerable inconvenience.

It should be noted that, as mentioned above, ① the brake pressing force $F_P$, ② the pedal stroke L, ④ the vehicle deceleration G, ⑤ the assumed vehicle speed $V_{SO}$ and ⑥ the wheel speed $V_W$ in addition to the above-mentioned ③ master cylinder pressure $P_{M/C}$ may be applicable as basic parameters. The vibration generated in the master cylinder pressure PM/C is transmitted to the brake pedal. Accordingly, a vibration is generated in ② the pedal stroke L. Additionally, at the time when the brake assist control is terminated, the pressing force applied to the brake pedal is reduced but continuously applied. Thereby, when the vibration is transmitted to the brake pedal, a vibration is generated in ① the brake pressing force $F_P$ irrespective of an intention of the driver. Further, when the brake assist control is terminated, a vibratory component appears in the behavior of the vehicle since a brake force is rapidly reduced. Thus, a vibration is generated also in ④ the vehicle deceleration G. ⑤ the assumed vehicle speed $V_{SO}$ and ⑥ the wheel speed $V_W$. As mentioned above, since a vibration is generated in the basic parameters when the brake assist control is terminated even if any one of parameters ① to ⑤ is used as the basic parameter, the start condition for the brake assist control may be established. Accordingly, the above-mentioned control routine can be effectively applied when the parameters other than ③ the master cylinder pressure $P_{M/C}$ is used as the basic parameter.

It should be noted that, In the above-mentioned embodiment, the control prohibiting means recited in claim 1 is achieved by the ECU 10 performing the process of steps 104 and 102 of the above-mentioned control routine.

A description will now be given, with reference to FIG. 4, of a second embodiment of the present invention. A brake force control apparatus according to the present embodiment is similar to the brake force control apparatus according to the above-mentioned first embodiment with respect to the system structure shown in FIG. 1 except for the ECU 10 performing a control routine shown in FIG. 4. The brake force control apparatus according to the present embodiment has a feature that the brake assist control is prevented from being excessively started due to an increase in the master cylinder pressure $P_{M/C}$ in association with a start of the ABS control as mentioned above or a vibration in $P_{M/C}$ by prohibiting a start of the brake assist control until an elapsed time after the start of the ABS control reaches a predetermined time.

Figure 4:
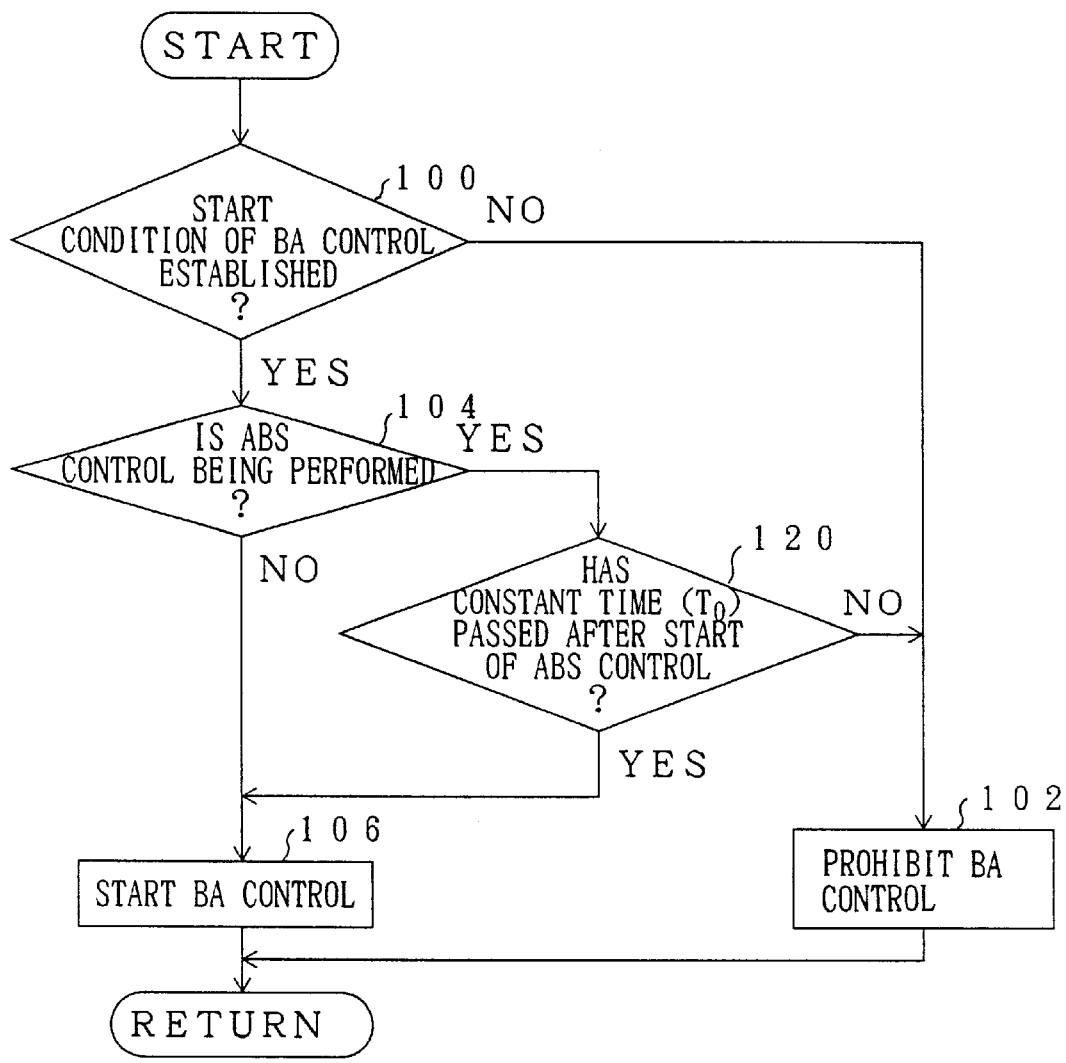
FIG. 4 is a flowchart of a routine performed in a second embodiment of the present invention.

FIG. 4 is a flowchart of an example of a control routine performed by the ECU 10. It should be noted that, in FIG. 4, steps that performs the same process as the steps of the routine shown in FIG. 3 are given the same reference numerals, and descriptions thereof will be omitted.

If it is determined, in step 104, that the ABS control is performed in one of the wheels, the process of step 120 is performed. In step 120, it is determined whether or not an elapsed time T after the start of the ABS control exceeds a predetermined time $T_0$. If it is determined, in step 120, that T does not exceeds $T_0$, an execution of the brake assist control is prohibited in step 102, and, then, the routine at this time is ended. If it is determined, in step 120, that T exceeds $T_0$, the brake assist control is started in step 106, and, then, the routine at this time is ended.

The above-mentioned predetermined time T0 is determined in consideration with a time $T_a$ and a time $T_b$. The time $T_a$ is a time after the start of the ABS control and until a state in which the master cylinder pressure $P_{M/C}$ is increased higher than that corresponding to a degree of operation by the driver due to a rapid increase in the increasing slope $dP_{M/C}$ of the master cylinder pressure, that is, a time until the drive responds to the rapid increase in the increasing slope so as to decrease a pedal pressing force. The time $T_b$ is a period during which the vibration of $P_{M/C}$ converges. The rapid increase in the increasing slope $dP_{M/C}$ of the master cylinder pressure is generated by the amount of brake fluid flowing from the master cylinder 32 to the wheel cylinders 44 due to an interruption of the conductivity between the master cylinder 32 and the wheel cylinders 44**. Accordingly, a degree of increase of the increasing slope associated with a start of the ABS control is increased in response to the number of wheel cylinders 44** disconnected from the master cylinder 32**. Accordingly, the above-mentioned times $T_a$ and $T_b$ are increased in response to the number of wheels on which the ABS control is performed. Generally, a capacity of the wheel cylinders of the front wheels is different from a capacity of the wheel cylinders of the rear wheels. Thus, an amount of brake fluid consumed per one wheel is different from the front wheels to the rear wheels. Accordingly, in the above-mentioned control routine, the predetermined time $T_0$ is set as $T_0$=(the number of front wheels on which the ABS control is performed)×T1+(the number of rear wheels on which the ABS control is performed)×T2 (T1 and T2 are constants corresponding to the capacity of the wheel cylinders of the front side and the rear side, respectively). It should be noted that, in the system according to the present embodiment, since the ABS control is performed commonly to the left and right wheels on the rear side, the number of the rear wheels on which the ABS control is performed is 0 or 2.

According to the above-mentioned control routine, a start of the brake assist control is prohibited until an increase in $P_{M/C}$ or a vibration of $P_{M/C}$ generated in association with a start of the ABS control. Thus, according to the system of the present embodiment, the brake assist control is prevented from being excessively started immediately after the start of the ABS control, and, thereby, an incongruous feel is prevented from being given to the driver.

It should be noted that, in the above-mentioned embodiment, control prohibiting means is achieved by the ECU 10 performing the process of step 120 and step 102 of the above-mentioned control routine.

A description will now be given, with reference to FIG. 5, of a third embodiment of the present invention. A brake force control apparatus according to the present is the same as the brake force control apparatus according to the above-mentioned first embodiment with respect to the system construction shown in FIG. 1 except for the ECU 10 performing a control routine shown in FIG. 5. The brake force control apparatus of the present embodiment has a feature that the brake assist control is prevented from being improperly started due to a vibration in the master cylinder pressure $P_{M/C}$ associated with an execution of the ABS control by increasing threshold values for the master cylinder pressure $P_{M/C}$ and the rate of change $\Delta P_{M/C}$ of the master cylinder pressure $P_{M/C}$ when a determination is made as to whether the brake assist control should be performed when the ABS control is being performed.

Figure 5:
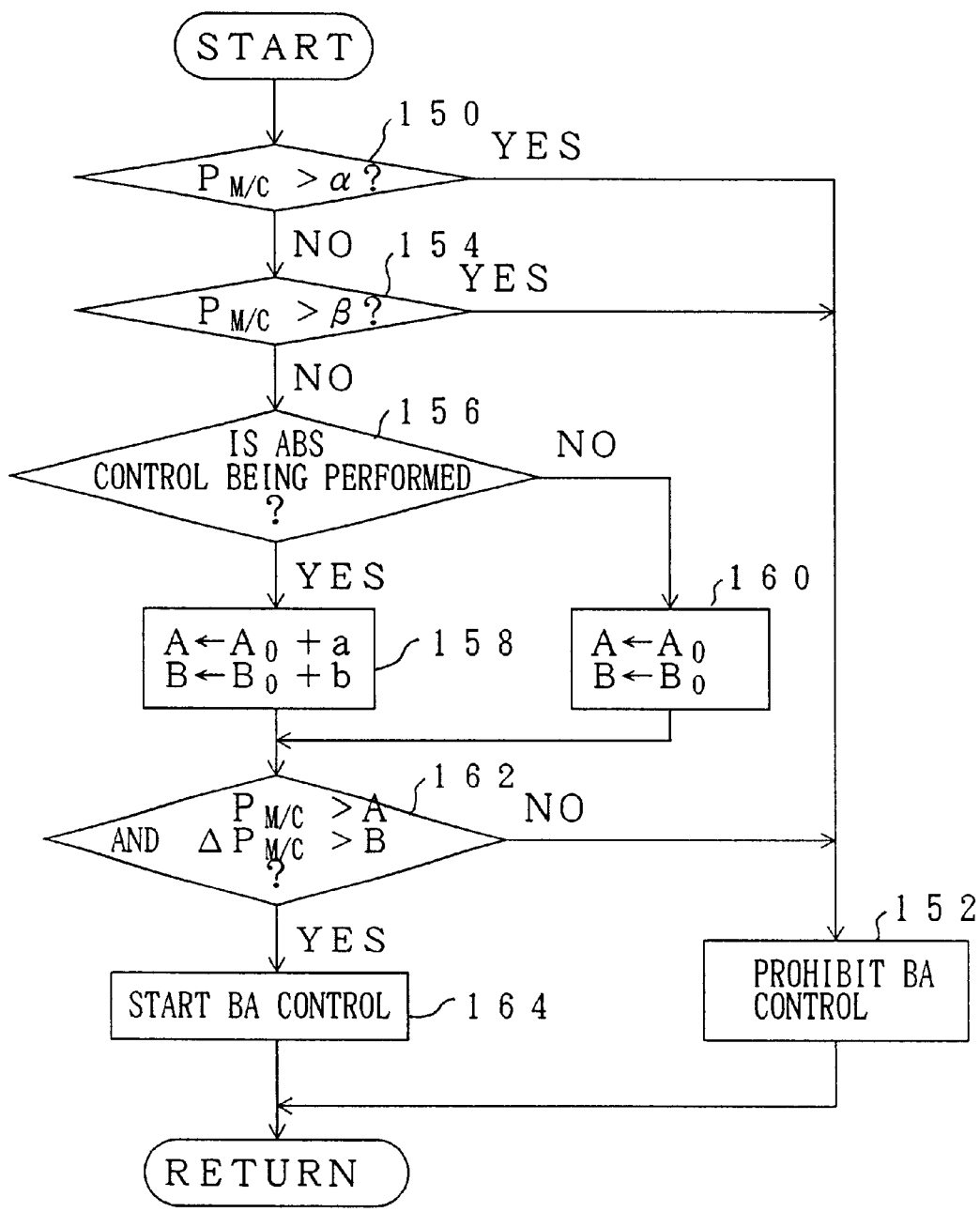
FIG. 5 is a flowchart of a routine performed in a third embodiment of the present invention.

FIG. 5 is a flowchart of an example of a control routine performed by the ECU 10. When the routine shown in FIG. 5 is started, the process of step 150 is performed first. In step 150, it is determined whether or not the master cylinder pressure $P_{M/C}$ is larger than a predetermined value $\alpha$. The predetermined value $\alpha$ is a value which is not output when the hydraulic pressure sensor 40 is normally operated. Accordingly, if it is determined that $P_{M/C}>\alpha$ is established, it can be determined that an abnormality occurs in the hydraulic pressure sensor 40. In this case, the process of step 152 is performed subsequently. On the other hand, if it is determined that $P_{M/C}>\alpha$ is not established, the process of step 154 is performed.

In step 152, execution of the brake assist control is prohibited. Accordingly, when an abnormality occurs in the hydraulic pressure sensor 40, the control is not continued based on an abnormal master cylinder pressure $P_{M/C}$. After the process of step 152 is completed, the routine at this time is ended.

In step 154, it is determined whether or not the rate of change $\Delta P_{M/C}$ of the master cylinder pressure $P_{M/C}$ is greater than a predetermined value $\beta$. The predetermined value $\beta$ is a value which is not generated when the hydraulic pressure sensor 40 normally outputs the master cylinder pressure $P_{M/C}$. Accordingly, if it is determined that $\Delta P_{M/C}>\beta$ is established, it can be determined that a noise is superimposed on the output signal of the hydraulic pressure sensor 40. In this case, the process of step 152 is performed subsequently. Thus, according to the brake force control apparatus of the present embodiment, an improper control is not performed due to an influence of a noise. On the other hand, if it is determined that $\Delta P_{M/C}>\beta$ is not established, the process of step 156 is performed next.

In step 156, it is determined whether or not the ABS control is performed on one of the wheels. If it is determined, in step 156, that the ABS control is performed on one of the wheels, the process of step 158 is then performed. On the other hand, if it is determined that the ABS control is not performed on any one of the wheels, the process of step 160 is preformed.

In step 158, a correction is made to the threshold values A and B for the master cylinder pressure $P_{M/C}$ and the rate of change $\Delta P_{M/C}$ of the master cylinder pressure $P_{M/C}$ when a determination is made as to whether the brake assist control should be performed when the ABS control is being performed. Such a correction is performed by adding correction values a and b to reference values $A_0$ and $B_0$ of the threshold values A and B, respectively. After the process of step 158 is completed, the process of step 162 is then performed.

On the other hand, in step 160, the threshold values A and B are substituted by the reference values $A_0$ and $B_0$. That is, when the ABS control is not being performed, the correction for the threshold values A and B is not performed. After the process of step 160 is completed, the process of step 162 is performed.

In step 162, it is determined whether or not a condition $P_{M/C}>A$ and $\Delta P_{M/C}>B$ is established. If it is determined that this condition is established, it is determined that the brake assist control should be started, and the process of step 164 is then performed. On the other hand, if it is determined that the above-mentioned condition is not established, the brake assist control is prohibited in step 152, and, then, the routine at this time is ended.

In step 164, the brake assist control is started. Thereafter, the depression of the brake pedal 30 is released, and the brake assist control is continued until the master cylinder pressure $P_{M/C}$ is decreased. After the process of step 164 is completed, the routine at this time is ended.

As mentioned above, when the ABS control is being performed, the threshold values A and B with respect to the master cylinder pressure $P_{M/C}$ and the rate of change $\Delta P_{M/C}$ of the master cylinder pressure are increased by the correction values a and b, respectively. Accordingly, if a vibration is superimposed on $P_{M/C}$ in association with execution of the ABS control, the start condition of the brake assist control is difficult to be established. Thereby, the brake assist control is prevented from being improperly started when the ABS control is being performed. In this case, the brake assist control is prevented from being not performed when an emergency braking is required during an execution of the ABS control by setting the correction values a and b to appropriate values in response to an amount of increase in $P_{M/C}$ and $P_{M/C}$ associated with the execution of the ABS control. As mentioned above, according to the present embodiment, the brake assist control is prevented from being improperly started when an emergency braking is not required, while the brake assist control is prevented from being not performed when the emergency braking is required during an execution of the ABS control. Thereby, an incongruous feel is prevented from being given to the driver.

It should be noted that, in the present embodiment, control start condition changing means is achieved by the ECU 10 performing the steps 156 and 158 of the above-mentioned control routine.

It should be noted that, in the present embodiment, although the threshold values A and B are always corrected during an execution of the ABS control as in the steps 156 and 158 of the above-mentioned routine, the threshold values A and B may be corrected only when an elapsed time after a start of the ABS control does not reach a predetermined time similar to the routine shown in FIG. 4.

Figure 6:
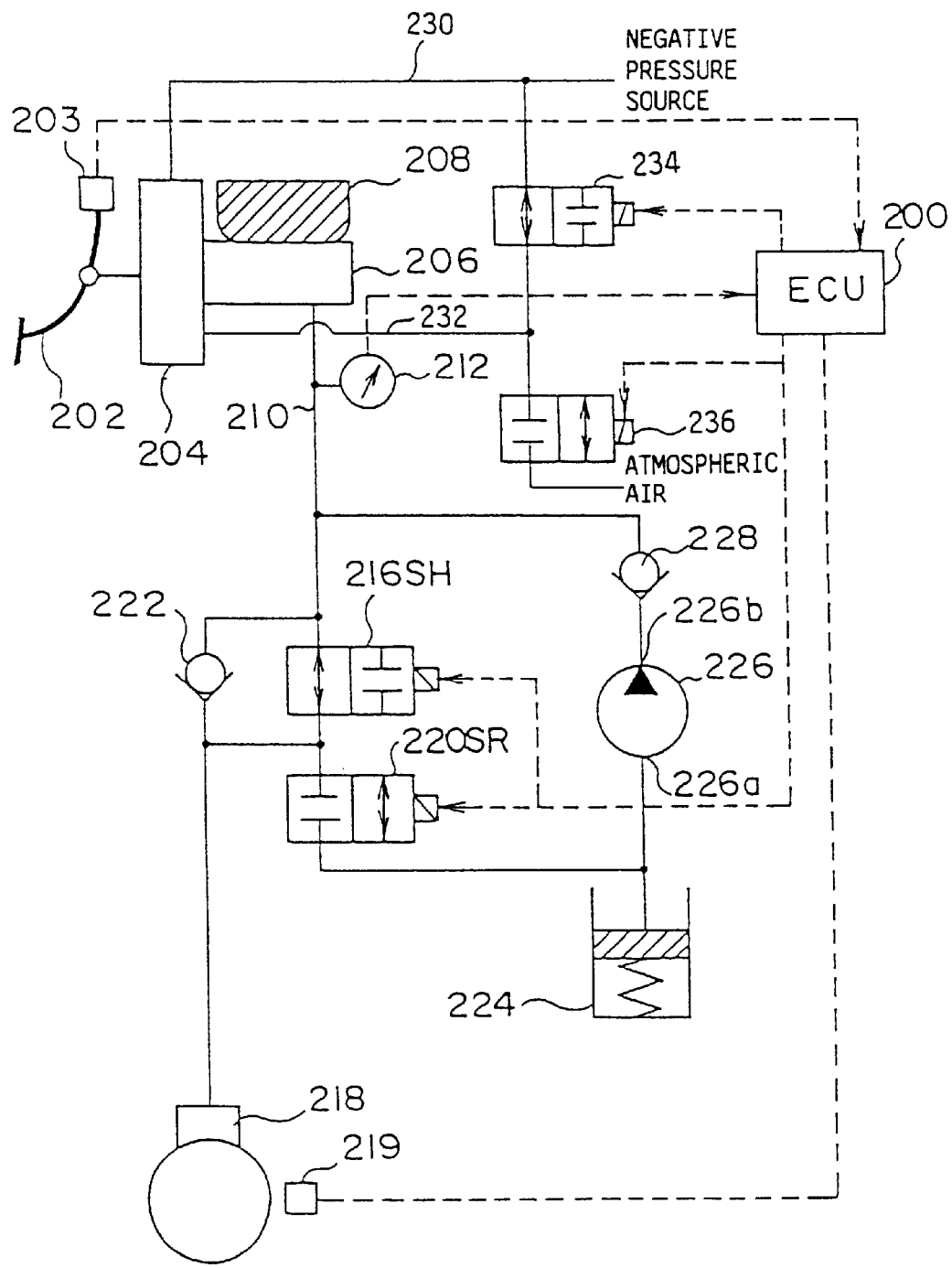
FIG. 6 is a flowchart of a routine performed in a fourth embodiment of the present invention.

A description will now be given, with reference to FIG. 6, of a seventh embodiment according to the present invention. FIG. 6 shows a system structure diagram of a brake force control apparatus according to the present embodiment. It should be noted that, in FIG. 6, only a part of the brake force control apparatus corresponding to one wheel is shown for the sake of convenience of description.

The brake force control apparatus shown in FIG. 6 is controlled by an ECU 200. The brake force control apparatus according to the present embodiment has a brake pedal 202. A brake switch 203 is provided near the brake pedal 202. The brake switch 203 is a switch which generates an ON output when the brake pedal 202 is pressed. The output signal of the brake switch 203 is supplied to the ECU 200. The ECU 200 determines whether or not a braking operation is being performed based on the output signal of the brake switch 203.

The brake pedal 202 is connected to a vacuum booster 204. The vacuum booster 204 is an apparatus which assists a brake pressing force by using an intake negative pressure of an internal combustion engine as a power source. A master cylinder 206 is fixed to the vacuum booster 204. The vacuum booster 204 transmits a resultant force of the brake pressing force $F_P$ which is applied to the brake pedal 206 and the brake assist force $F_A$ which is generated by itself to the master cylinder 206.

The master cylinder 206 has a fluid pressure chamber therein. Additionally, a reservoir tank 208 is provided above the master cylinder 206. The fluid pressure chamber of the master cylinder and the reservoir tank 208 communicate with each other when a press of the brake pedal 202 is released, whereas they are disconnected from each other when the brake pedal is pressed. Accordingly, brake fluid is supplied to the fluid pressure chamber each time the press of the brake pedal 202 is released.

The fluid pressure chamber of the maser cylinder 206 communicates with a fluid pressure passage 210. The fluid pressure passage 210 is provided with a hydraulic pressure sensor 212 which outputs an electric signal corresponding to a pressure inside the fluid pressure passage 210. The output signal of the hydraulic pressure sensor 212 is supplied to the ECU 200. The ECU 200 detects a fluid pressure generated by the master cylinder 206, that is, the master cylinder pressure $P_{M/C}$ based on the output signal of the hydraulic pressure sensor 212.

The fluid pressure passage 210 is provided with a holding solenoid 216 (hereinafter, referred to as SH 216). The SH 216 is a two-position solenoid valve which maintains an open state in a normal state (OFF state). The SH 216 is set to be in an ON state (closed state) by a drive signal being supplied by the ECU 200.

The downstream side of the SH 216 communicates with a wheel cylinder 218 and a pressure decreasing solenoid 220 (hereinafter, referred to as SR220). The SR 220 is a two-position solenoid valve which maintains a closed state in a normal state (OFF state). SR 220 is set to be in an ON state (open state) by a drive signal being supplied by the ECU 200. Additionally, a check valve 222 which permits a fluid flow only in a direction from the wheel cylinder 218 to the fluid pressure passage 210 is provided between the wheel cylinder 218 and the fluid pressure passage 210.

A wheel speed sensor 219 which generates a pulse signal each time the wheel rotates a predetermined angle is provided near the wheel cylinder 218. An output signal of the wheel speed sensor 219 is supplied to the ECU 200. The ECU 200 detects a wheel speed based on the output signal of the wheel speed sensor 219.

A reservoir 224 is provided on the downstream side of the SR 220. The brake fluid flowing out of the SR 220 when the SR 220 is set to be in the ON state (open state) is stored in the reservoir 224. It should be noted that the reservoir previously stores a predetermined amount of brake fluid. The reservoir 224 communicates with an inlet port 226a of a pump 226. Additionally, an outlet port 226b of the pump 226 communicates with the fluid pressure passage 210 via a check valve 228. The check vale 228 is a one-way valve which permits a fluid flow only in a direction from the pump 226 to the fluid pressure passage 210.

The vacuum booster 204 communicates with a negative pressure passage 230 and a pressure adjusting passage 232. The negative pressure passage 230 communicates with a negative pressure source such as an intake system of an internal combustion engine. On the other hand, the pressure adjusting passage 232 communicates with a negative pressure introducing valve 234 and an atmospheric pressure introducing valve 236. The negative pressure introducing valve 234 is a two-position solenoid valve located between the pressure adjusting passage 232 and the negative pressure passage 230, and maintains an open state ins a normal state (OFF state). On the other hand, the atmospheric pressure introducing valve 236 is a two-position solenoid valve which controls a communication between the pressure adjusting passage 232 and an atmosphere, and maintains a closed state in a normal state (OFF state). The negative pressure introducing valve 234 and the atmospheric pressure introducing valve 236 are caused to be an ON state (closed state or open state) by drive signals being supplied from the ECU 200.

The vacuum booster 204 has a negative pressure chamber and a pressure changing chamber separated from each other by a diaphragm therein. The negative pressure chamber communicates with the negative pressure passage 230, and is maintained at a predetermined negative pressure during an operation of the vehicle. The pressure-changing chamber communicates with the pressure adjusting passage 232 and an atmospheric space via a valve mechanism which adjusts a pressure inside the pressure-changing chamber. The valve mechanism associates with an operation of the brake pedal 202, and operates as follows.

When a negative pressure is introduced into the pressure adjusting passage 232, the valve mechanism causes the pressure changing chamber to communicate with the atmospheric space until a pressure difference corresponding to the brake pressing force $F_P$ is generated between the pressure changing chamber and the negative pressure chamber. In this case, an urging force corresponding to the pressure difference between the pressure changing chamber and the negative pressure chamber, that is, the urging force corresponding to the brake pressing force $F_P$ is exerted on the diaphragm. The vacuum booster 204 transmits the urging force to the master cylinder 206 as the brake assist force $F_A$. Additionally, the valve mechanism introduces an atmospheric pressure to the pressure changing chamber irrespective of the brake pressing force $F_P$ when the atmospheric pressure is introduced into the pressure adjusting passage 232. In this case, an urging force corresponding to a pressure difference between a pressure inside the negative pressure chamber and the atmospheric pressure is exerted on the diaphragm, and a maximum brake assist force $F_{MAX}$ is generated by the vacuum booster.

A description will now be given of an operation of the brake force control apparatus according to the present embodiment. Similar to the ECU 10 in the above-mentioned first embodiment, the ECU 200 determines whether or not the brake assist control should be started, by performing the routines shown in FIG. 4 to FIG. 6.

In the system according to the present embodiment, when the ECU 200 performs the normal control, both the negative pressure introducing valve 234 and the atmospheric pressure introducing valve 236 are maintained to be the OFF state. In this case, the vacuum booster 204 generates the brake assist force $F_A$ corresponding to the brake pressing force $F_P$ as mentioned above. As a result, a resultant force of the brake pressing force $F_P$ and the brake assist force $F_A$ is transmitted to the master cylinder 206.

When the resultant force of the brake assist force $F_A$ and the brake pressing force $F_P$ is transmitted to the master cylinder 206, the master cylinder 206 generates a master cylinder pressure $P_{M/C}$ having a predetermined power ratio with respect to the brake pressing force $F_P$.

The ECU 200 turns off the SH 216 and SR 220 and maintains the pump 226 at a stopped state when a state of the vehicle is stable. When the hydraulic circuit is set to the normal state, the master cylinder pressure $P_{M/C}$ is introduced into the wheel cylinder 218 as it is. Accordingly, the brake force generated in the wheel cylinder 218 is adjusted to a level corresponding to the brake pressing force $F_P$.

If a slip rate S of a wheel exceeds a predetermined value after the braking operation is started, the ECU 200 starts the ABS control similar to the ECU 10 of the above-mentioned first embodiment. The ABS control is achieved by driving the SH 216 and the SR 220 while operating the pump 226 as mentioned below when the brake pedal 202 is pressed, that is, when the master cylinder pressure $P_{M/C}$ is appropriately increased.

When an appropriately increased master cylinder pressure $P_{M/C}$ is output from the master cylinder 204, the SH 216 is set to the open state and the SR 220 is set to the closed state, and, thereby, the wheel cylinder pressure $P_{W/C}$ is increased with the master cylinder pressure $P_{M/C}$ as an upper limit value. Hereinafter, this state is referred to as a pressure-increasing mode ①. Additionally, in the same circumstances, the wheel cylinder pressure $P_{W/C}$ is maintained without being increased or decreased by the SH 216 being set to the closed state and the SR 220 being set to the closed state. Additionally, the wheel cylinder pressure $P_{W/C}$ can be decreased by the SH 216 being set to the open state and the SR 220 being set to the open state. Hereinafter, these states are referred to as a holding mode ② and a pressure-decreasing mode ③, respectively. The ECU 200 achieves, if necessary, the above-mentioned pressure-increasing mode ①, holding mode ② and pressure-decreasing mode ③ so that a slip rate S of the wheel becomes an appropriate value.

When a depression of the brake pedal 202 is released by the driver during execution of the ABS control, the wheel cylinder pressure $P_{W/C}$ must be immediately decreased. In the system according to the present embodiment, the check valve 222 is provided in the hydraulic circuit corresponding to the wheel cylinder 218. The check valve 222 permits a fluid flow only in the direction from the wheel cylinder 218 to the master cylinder 206. Thus, according to the system of the present embodiment, the wheel cylinder pressure $P_{W/C}$ of the wheel cylinder 222 can be immediately decreased after the depression of the brake pedal 202 is released.

In the system according to the present embodiment, when the ABS control is performed, the wheel cylinder pressure $P_{W/C}$ is increased by the master cylinder 206 as a fluid pressure source. Additionally, the wheel cylinder pressure $P_{W/C}$ is decreased by having the brake fluid in the wheel cylinder to flow to the reservoir 224. Accordingly, if the pressure increasing mode and the pressure decreasing mode are repeatedly performed, the brake fluid in the master cylinder 206 gradually flows to the reservoir 224. However, in the system according to the present embodiment, the brake fluid in the reservoir 224 is delivered to the master cylinder 206 by the pump 226. Thus, if the ABS control is continued for a long time, a so-called bottoming of the master cylinder does not occur.

A description will now be given of an operation achieved by the ECU 200 performing the brake assist control. The brake assist control is achieved by turning on both the negative pressure introducing valve 234 and the atmospheric pressure introducing valve 236, that is, by closing the negative pressure introducing valve 234 and opening the atmospheric pressure introducing valve 236.

When the brake assist control is started in the system of the present embodiment, an atmospheric air is introduced into the pressure adjusting passage 232. As mentioned above, when an atmospheric air is introduced into the pressure adjusting passage 232, the vacuum booster 204 generates a maximum brake assist force $F_{AMAX}$. Accordingly, after the brake assist control is started, a resultant force of the maximum brake assist force $F_{AMAX}$ and the brake pressing force $F_P$ is transmitted to the master cylinder 206.

After the execution condition of the brake assist control is established and until the execution condition of the ABS control is established, the ECU 200 causes the hydraulic circuit connected to the master cylinder 206 to be a normal state. In this case, the master cylinder pressure $P_{M/C}$ is introduced into the wheel cylinder 218. Accordingly, the wheel cylinder pressure $P_{W/C}$ is rapidly increased from a pressure corresponding to "$F_A+F_P$" to a pressure corresponding to "$F_{AMAX}+F_P$" when the brake assist control is started.

As mentioned above, according to the system of the present embodiment, when an emergency braking operation is performed, the wheel cylinder pressure $P_{W/C}$ can be increased to a sufficiently large value as compared to the brake pressing force $F_P$. Thus, according to the system of the present embodiment, a large brake force can be generated immediately after a condition in which an emergency braking is required occurs even if the driver is a beginner-grade driver.

After the wheel cylinder pressure $P_{W/C}$ is rapidly increased as mentioned above, the slip rate S of the wheel is rapidly increased, and finally the execution condition of the ABS control is established. After the execution condition of the ABS control is established, the ECU 200 achieves, if necessary, the above-mentioned pressure-increasing mode ①, holding mode ② and pressure-decreasing mode ③ so that a slip rate S of the wheel becomes an appropriate value.

In the system according to the present embodiment, in a period during which the brake pressing force $F_P$ is applied to the brake pedal 202 after the brake assist control is started, the master cylinder pressure $P_{M/C}$ is maintained to be a pressure corresponding to "$F_{AMAX}+F_P$". On the other hand, if a depression of the brake pedal 202 is released after the brake assist control is started, the master cylinder pressure $P_{M/C}$ is decreased to a pressure corresponding to "$F_{AMAX}$".

Accordingly, by monitoring the output signal of the master cylinder pressure $P_{M/C}$ detected by the hydraulic pressure sensor 212, the ECU 200 can determine whether or not the depression of the brake pedal 202 is released. Upon detection of the release of the depression of the brake pedal 202, the ECU 200 stops supply of the drive signals to the negative pressure introducing valve 234 and the atmospheric pressure introducing valve 236, and terminates the brake assist control.

As mentioned above, in the system according to the present embodiment, if it is determined that a slip rate of a wheel exceeds a predetermined value, the ECU 200 achieves the pressure-increasing mode ①, holding mode ② and pressure-decreasing mode ③ by changing an ON/OFF state of the SH 216 and SR 220 so that a slip rate S of the wheel becomes an appropriate value. Accordingly, since an ON and OFF of the hydraulic circuit communicating with the master cylinder 206 is repeated when the ABS control is performed, a vibration is generated in the master cylinder pressure $P_{M/C}$. Due to such a vibration, the master cylinder pressure $P_{M/C}$ and the rate of change $\Delta P_{M/C}$ of the master cylinder pressure may exceed predetermined values, and the start condition of the brake assist control may be established.

On the other hand, in the system according to the present embodiment, effects the same as that of the above-mentioned first to third embodiments can be obtained by the ECU performing the control routines shown in FIG. 3 to FIG. 5.

It should be noted that, in the present embodiment, although ③ the master cylinder pressure $P_{M/C}$ is used as the basic parameter, the basic parameter is not limited to this, and, similar to the first embodiment, the brake pressing force $F_P$, the pedal stroke L, the vehicle deceleration G, the assumed vehicle speed $V_{SO}$ or the vehicle speed $V_W$** may be used as the basic parameter.

The present invention is not limited to the specifically disclosed embodiments, and variations and modifications may be made without departing from the scope of the present invention.

What is claimed is:

1. A brake force control apparatus comprising:

means for performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force; and control prohibiting means for determining whether or not said antilock brake control is being performed, and for prohibiting a start of said brake assist control when said antilock brake control is being performed.

2. A brake force control apparatus comprising:

means for performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force; and control prohibiting means for determining whether or not said antilock brake control is being performed, and for prohibiting a start of said brake assist control until a predetermined time has passed after said antilock brake control is being performed.

3. A brake force control apparatus comprising:

means for performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force; and control start condition changing means for determining whether or not said antilock brake control is being performed, and for changing said predetermined condition so as to change a condition for starting an execution of the brake assist control.

4. A brake force control apparatus comprising:

means for performing a normal control for generating a brake force corresponding to a brake pressing force, a brake assist control for generating a brake force larger than that of the normal control when an operational state of a brake pedal satisfies a predetermined condition and an antilock brake control for preventing a slip of a wheel by controlling a brake force; and control start condition changing means for determining whether or not said antilock brake control is being performed, and for changing said predetermined condition until a predetermined time has passed after said antilock brake control was started so as to change a condition for starting an execution of brake assist control.

5. The brake force control apparatus as claimed in claim 3 or 4, wherein said predetermined condition includes a first threshold value of a pressure of a master cylinder and a second threshold value of a rate of change of said pressure, and said predetermined condition is changed by obtaining a first and a second correction value by adding a first and a second predetermined value to said first and second threshold values, respectively.

6. The brake force control apparatus as claimed in claim 5, wherein a start of the brake assist control is permitted only when the pressure of said master cylinder is greater that the first correction value of said first threshold value and said rate of change of said pressure is greater that the second correction value of said second threshold value.

\* \* \* \* \*